United States Patent
Moran

(10) Patent No.: US 12,481,750 B2
(45) Date of Patent: Nov. 25, 2025

(54) METHOD OF PROCESSING TRANSACTIONS FROM AN UNTRUSTED SOURCE

(71) Applicant: Arm IP Limited, Cambridge (GB)

(72) Inventor: Brendan James Moran, Histon (GB)

(73) Assignee: Arm IP Limited, Cambridge (GB)

( * ) Notice: Subject to any disclaimer, the term of this patent is extended or adjusted under 35 U.S.C. 154(b) by 522 days.

(21) Appl. No.: 17/040,353

(22) PCT Filed: Jul. 19, 2019

(86) PCT No.: PCT/GB2019/052025
§ 371 (c)(1),
(2) Date: Sep. 22, 2020

(87) PCT Pub. No.: WO2020/049266
PCT Pub. Date: Mar. 12, 2020

(65) Prior Publication Data
US 2021/0089643 A1    Mar. 25, 2021

(30) Foreign Application Priority Data
Sep. 6, 2018  (GB) ..................................... 1814556

(51) Int. Cl.
*G06F 21/53*     (2013.01)
*G06F 21/56*     (2013.01)

(52) U.S. Cl.
CPC ............ *G06F 21/53* (2013.01); *G06F 21/566* (2013.01); *G06F 2221/033* (2013.01); *G06F 2221/2149* (2013.01)

(58) Field of Classification Search
CPC ............... G06F 21/53; G06F 2221/033; G06F 2221/2149
See application file for complete search history.

(56) References Cited

U.S. PATENT DOCUMENTS 8,990,945 B1   3/2015 Ranadive et al.
9,917,855 B1   3/2018 Li et al.
(Continued)

FOREIGN PATENT DOCUMENTS

EP   2 610 776   7/2013
EP   3 267 349   1/2018
(Continued)

OTHER PUBLICATIONS

International Search Report and Written Opinion of the International Searching Authority for PCT/GB2019/052025 mailed Oct. 21, 2019, 13 pages.
(Continued)

*Primary Examiner* — Jeffrey D. Popham
(74) *Attorney, Agent, or Firm* — NIXON & VANDERHYE P.C.

(57) ABSTRACT

Methods and apparatus are described for processing transactions from untrusted sources which reduce the risk of a maliciously instructed transaction being processed at a target environment and thus preventing undesirable behaviour resulting from processing the transaction occurring at the target environment. An execution manager is provided to process transactions/portions of transactions in an emulated environment and monitor the resultant effects. Following execution of the transaction at the emulated environment, it is determined whether undesirable behaviour occurred at the emulated environment and whether the transaction may be executed in the target environment. The method enables transactions from untrusted sources to be processed with minimal risks of malicious consequences occurring at the target environment.

19 Claims, 11 Drawing Sheets

(56) References Cited

U.S. PATENT DOCUMENTS

| | | | |
|---|---|---|---|
| 2006/0095971 A1* | 5/2006 | Costea | G06F 21/562 |
| | | | 726/26 |
| 2006/0294102 A1 | 12/2006 | Reddish et al. | |
| 2011/0247072 A1* | 10/2011 | Staniford | H04L 63/1491 |
| | | | 726/24 |
| 2014/0180666 A1 | 6/2014 | Muttik | |
| 2015/0096022 A1* | 4/2015 | Vincent | G06F 21/562 |
| | | | 726/23 |
| 2016/0277424 A1* | 9/2016 | Mawji | G06Q 20/4016 |
| 2017/0237741 A1* | 8/2017 | Bell | G06Q 20/40 |
| | | | 726/4 |
| 2017/0286671 A1* | 10/2017 | Chari | G06F 21/552 |
| 2019/0318090 A1* | 10/2019 | Sandoval | G06F 21/566 |

FOREIGN PATENT DOCUMENTS

| | | |
|---|---|---|
| WO | 2014/099623 | 6/2014 |
| WO | 2015/127472 | 2/2015 |

OTHER PUBLICATIONS

International Search Report for PCT/GB2019/052025 mailed Oct. 21, 2019, 3 pages.
Combined Search and Examination Report for GB1814556.5 mailed Feb. 26, 2019, 11 pages.
Examination Report GB1814556.5 mailed Oct. 8, 2019, 4 pages.
First Office Action for CN Application No. 201980029263.6 dated Oct. 26, 2023 and English translation, 28 pages.

* cited by examiner

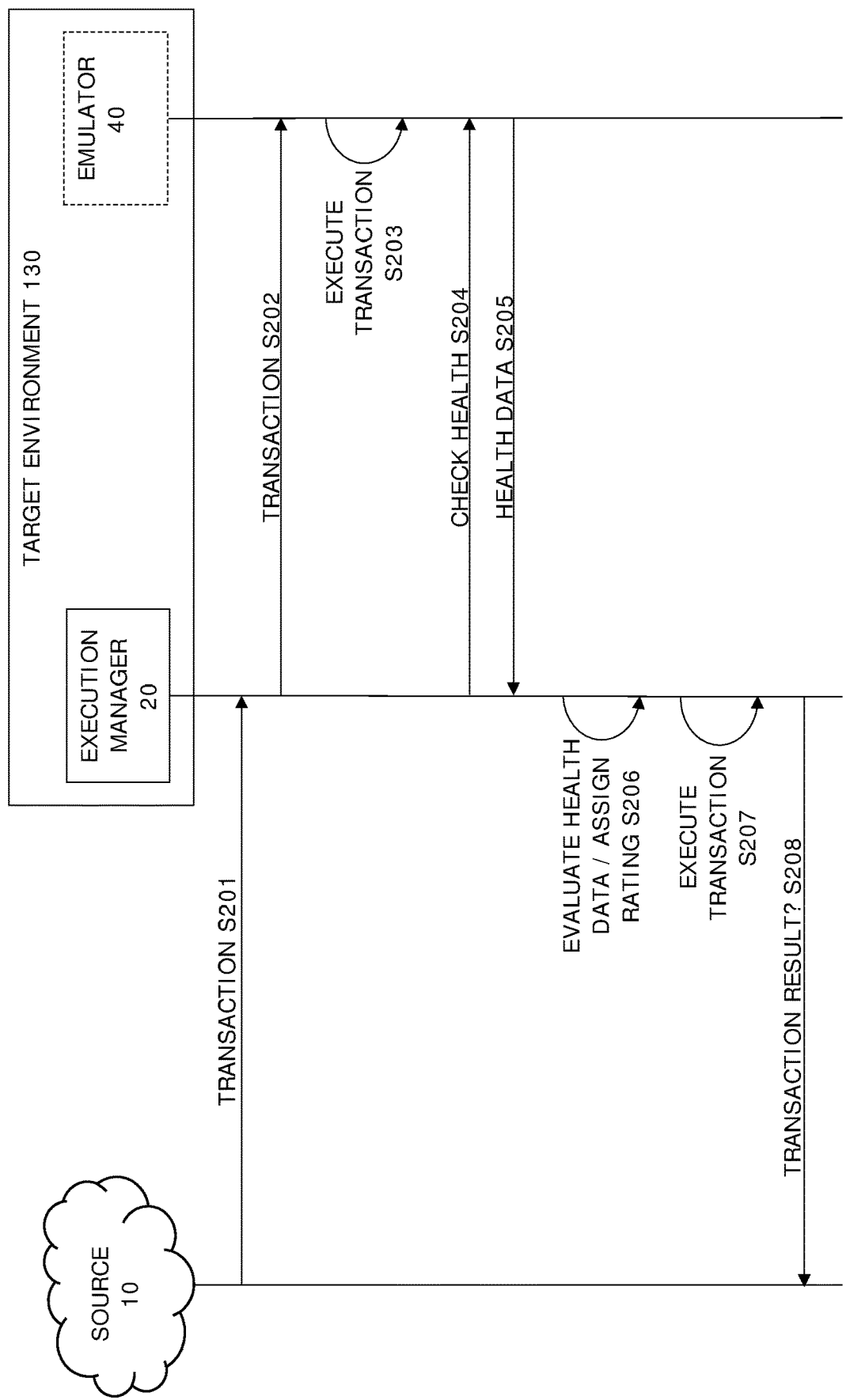

METHOD OF PROCESSING TRANSACTIONS FROM AN UNTRUSTED SOURCE

This application is the U.S. national phase of International Application No. PCT/GB2019/052025 filed Jul. 19, 2019 which designated the U.S. and claims priority to GB Patent Application No. 1814556.5 filed Sep. 6, 2018, the entire contents of each of which are hereby incorporated by reference.

The present techniques relate to methods and apparatus for processing transactions from untrusted sources to mitigate the risk of maliciously instructed transactions being processed at a device. More particularly, the techniques relate to methods and apparatus for processing transactions from untrusted sources which reduce the risk of maliciously instructed transactions being processed at a target environment and thus preventing undesirable behaviour resulting from processing the transaction occurring at the target environment.

More and more devices are being connected, for example as part of the Internet of Things (IoT). However, these devices are often mutually untrusted devices and/or may comprise mutually untrusted execution environments, such as Arm TrustZone™. Executing an instruction from an untrusted source may lead to the resultant state of the device which processed the transaction being undesired. Nevertheless, it may be necessary for devices to process transactions in response to a request from an untrusted source.

According to a first technique, there is provided a computer implemented method of processing a transaction to mitigate undesirable behaviour such as a malicious attack occurring at an intended target environment resulting from processing the transaction. The method comprising: receiving, at an execution manager, a transaction to be executed; executing, in an emulated environment, at least a portion of the transaction and monitoring the emulated environment for the presence of pre-defined events and/or internal state changes indicative of undesirable behaviour; determining a first emulation confidence value ($E_{CV}$) relating to the at least a portion of the transaction based on the presence or absence of any monitored pre-defined events and/or internal state changes, the first emulation confidence value for use in determining whether to execute the transaction in the intended target environment.

According to a second technique, there is provided a computer readable storage medium comprising program code for performing the methods described herein.

According to a third technique, there is provided an execution manager for processing a transaction to mitigate undesirable behaviour occurring at an intended target environment resulting from processing the transaction. The execution manager comprising: a communications module for receiving a transaction to be executed at the intended target environment; an emulator for executing at least a portion of the transaction; and a processor for monitoring the emulator during execution of the at least a portion of the transaction for the presence of pre-defined events and/or internal state changes indicative of undesirable behaviour, for determining a first emulation confidence value relating to the at least a portion of the transaction based on the presence or absence of any monitored pre-defined events and/or internal state changes, and for using the first emulation confidence value to determine whether to execute the transaction in the intended target environment.

According to a fourth technique, there is provided a target environment comprising the execution manager described herein.

According to a fifth technique, there is provided a system for processing a transaction to mitigate undesirable behaviour occurring at an intended target environment resulting from processing the transaction. The system comprising: an execution manager for receiving a transaction to be executed at the intended target environment, for executing, in an emulated environment, at least a portion of the transaction, and for monitoring the emulated environment for the presence of pre-defined events and/or internal state changes indicative of undesirable behaviour; a transaction rating unit for determining a first emulation confidence value relating to the at least a portion of the transaction based on the presence or absence of any monitored pre-defined events and/or internal state changes, wherein the first emulation confidence value is used to determine whether to execute the transaction in the intended remote target environment; and a threat analysis system for receiving a plurality of first emulation confidence values for a plurality of transactions and for adjusting the first emulation confidence values for future transactions based on the plurality of first emulation confidence values.

Embodiments will now be described with reference to the accompanying figures of which:

FIG. 2A illustrates schematically a target environment comprising an execution manager as one of its components;

Methods and apparatus are described herein for processing transactions from untrusted sources which reduce the risk of a maliciously instructed transaction being processed at a target environment and thus preventing undesirable behaviour resulting from processing the transaction occurring at the target environment. An execution manager is provided to process transactions/portions of transactions in an emulated environment and monitor the resultant effects. Following execution of the transaction at the emulated environment, the execution manager determines whether undesirable behaviour occurred at the emulated environment. The execution manager may then determine whether the transaction may be executed in the target environment. The method enables transactions from untrusted sources to be processed with reduced risks of malicious consequences occurring at the target environment.

Reference will now be made in detail to the embodiments, examples of which are illustrated in the accompanying drawings. In the following detailed description numerous specific details are set forth by way of examples in order to provide a thorough understanding of the relevant teachings.

However, it will be apparent to one of ordinary skill in the art that the present teachings may be practiced without these specific details.

In other instances, well known methods, procedures, components and/or circuitry have been described at a relatively high-level, without detail, in order to avoid unnecessarily obscuring aspects of the present teachings.

Figure 1A:
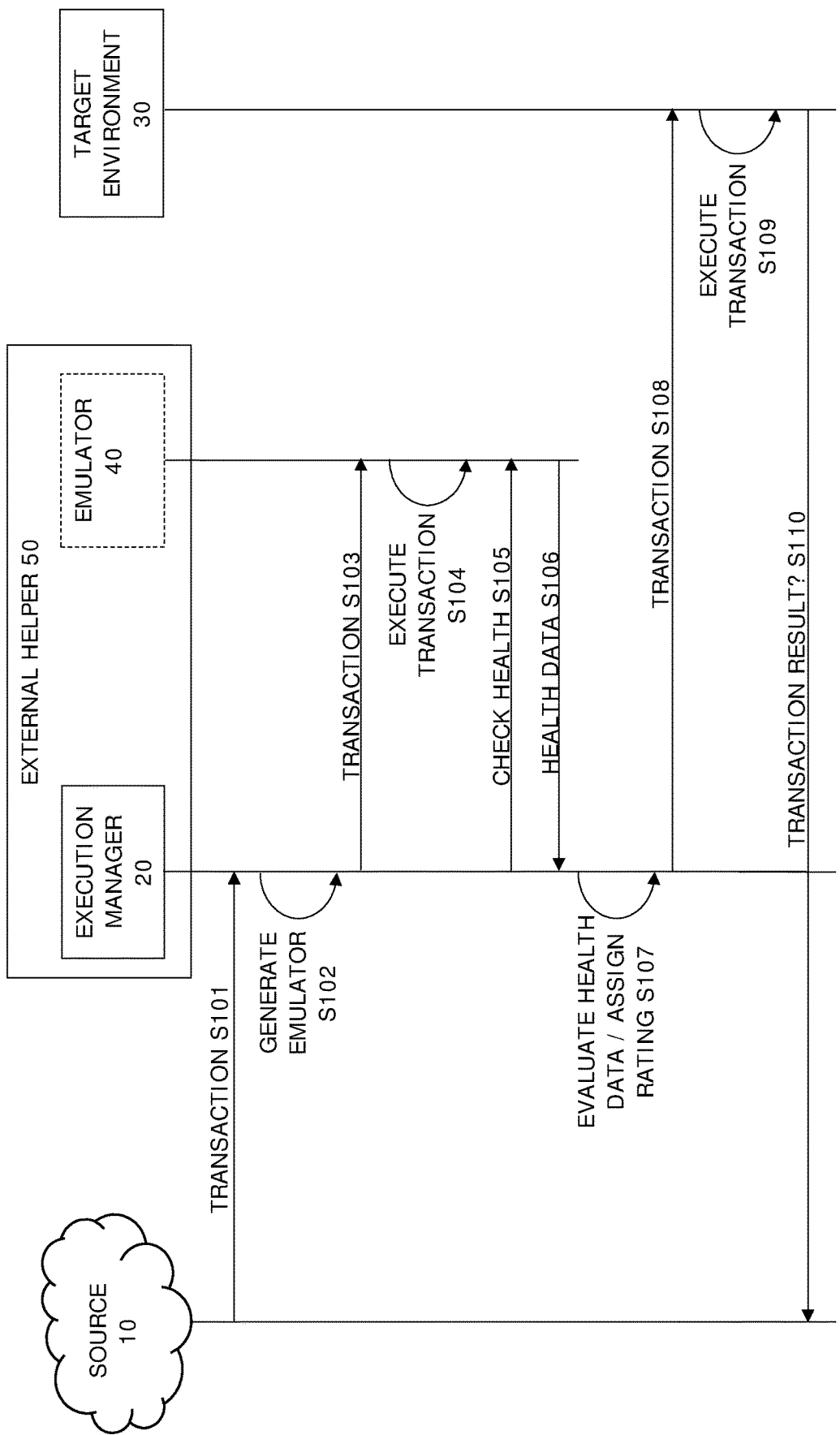
FIG. 1A illustrates schematically an external helper for processing a transaction from an untrusted source.

FIG. 1A illustrates schematically an external helper provided to protect a target environment from an untrusted source. The external helper 50 comprises an execution manager 20, and is provided between an untrusted source, such as cloud 10, and the target environment 30, such that all transactions from the cloud 10 to the target environment 30 are routed via the external helper 50. The cloud 10 and the target environment 30 are mutually untrusted. However, the target environment 30 trusts the external helper 50.

A transaction is one or more operations initiated by an entity, which does not form part of the target environment, to be performed at one or more resources of the target environment. An untrusted source is any source which is not completely trusted.

The target environment 30 may be a simple Internet of Things (IoT) device, such as a temperature sensor, healthcare monitor, electronic door lock etc., which may be vulnerable to malicious attacks since it does not have the capability and/or capacity to protect itself. In addition, the target environment 30 may be any device, such as a smart phone, laptop computer, smart watch etc., which may be vulnerable to malicious attacks. The external helper 50 may be an external device provided to protect the target environment 30. Alternatively, the components of the external helper 50, i.e. an execution manager 20 and one or more emulators 40 may be provided at the target environment 30 to protect the target environment 30, as illustrated in FIGS. 2A to 2D and described in further detail below.

Referring to FIG. 1A, the untrusted source 10 issues a transaction for processing at step S101. The transaction is received at the external helper 50 and the execution manager 20 generates one or more emulators 40 at step S102. Each emulator 40 may be considered an emulated environment or a virtual machine. The emulator 40 may emulate the functionality of one or more components of the target environment 30. The emulator 40 may not be required to emulate all the functions of the target environment 30 and/or may only be required to emulate the functions of one or more (vulnerable) components of the target environment 30. Alternatively, the emulator 40 may emulate the functionality of the entire target environment 30. The extent to which the emulator 40 emulates the target environment 30 may depend on which components of the target environment 30 are required to process each received transaction and may vary for each received transaction. The emulator 40 may only emulate the functionality of the target environment 30 to the extent where it can be determined whether processing the transaction will result in undesirable behaviour occurring at the target environment 30.

Following generation of an emulator 40 at step S102, the execution manager 20 instructs the emulator 40 to perform the transaction from the untrusted source 10 at steps S103 and S104. The emulator 40 processes, at least a portion of, the transaction, and the health of the emulator 40 following execution of the transaction is monitored by the execution manager 20 at steps S105 and S106. The health of the emulated target environment is inspected before and after the transaction has been performed, and the before and after emulated target environment is compared to see if there have been any undesirable changes. For example, the resultant system effects are monitored to detect the presence or absences of pre-defined events and/or internal state changes occurring at the emulated target environment which indicate undesirable behaviour and/or any other negative consequences arising from processing the transaction.

Examples of events and/or internal state changes which the execution manager may look for when performing a health check of an emulator are:
- dropped tasks:
- modified values stored in high security areas;
- changes to users or rights;
- reads from protected areas;
- crashes;
- stack overflows;
- other system failures;
- access to protected hardware;
- heuristics based on code execution The health data is evaluated and a transaction confidence value (rating) derived from the results of the inspection is assigned to the transaction at step S107. According to one embodiment, the execution manager 20 evaluates the health data and determines the transaction confidence value.

Figure 1B:
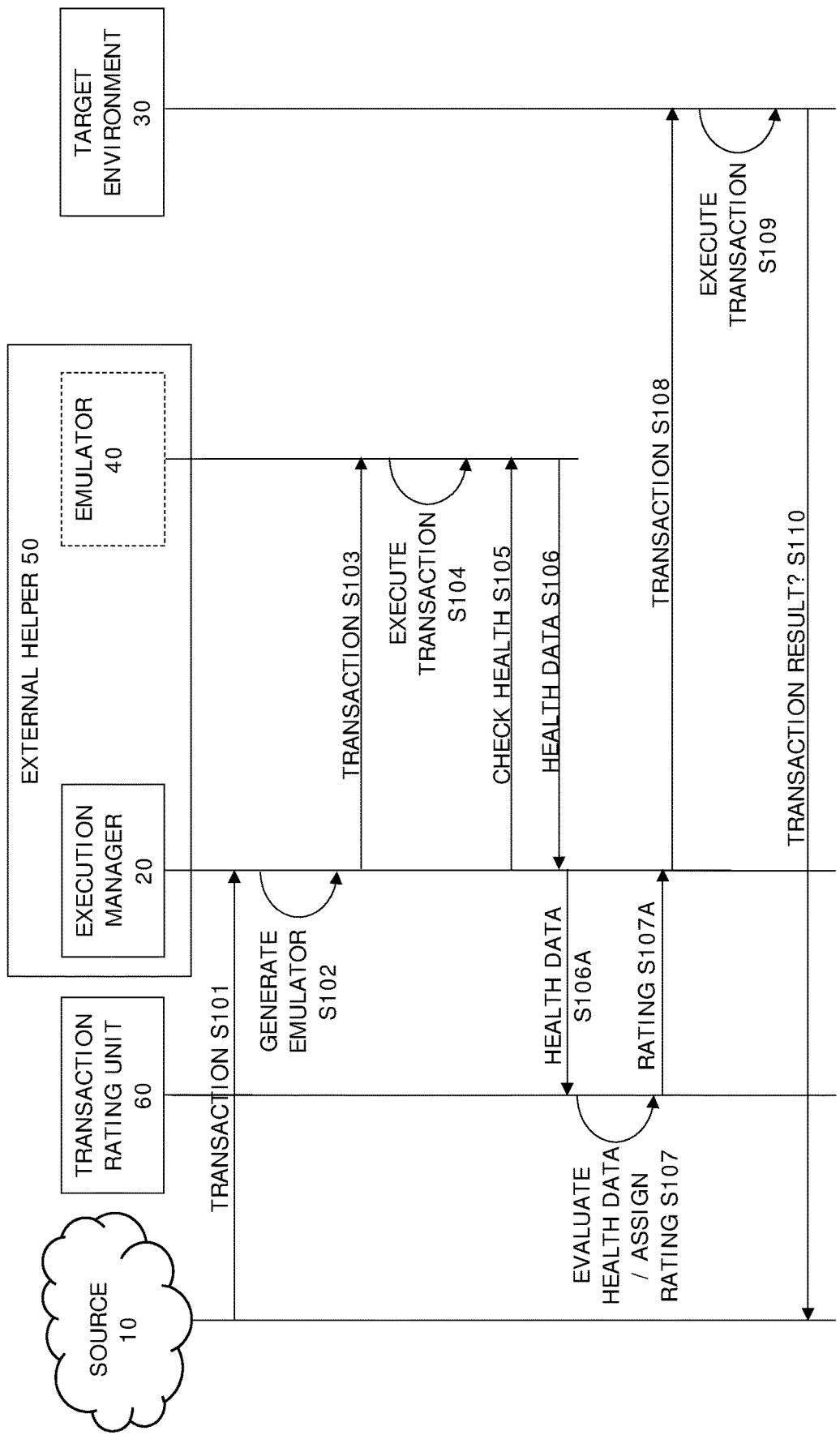
FIG. 1B illustrates schematically an external helper for processing a transaction from an untrusted source

According to another embodiment, illustrated in FIG. 1B, a transaction rating unit 60, separate from the execution manager 20, evaluates the health data and determines a transaction confidence value for the transaction at step S107. The execution manager 20 transfers the health data to the transaction rating unit 60 for inspection at step S106A, and the transaction rating unit 60 transfers the transaction confidence value (rating) to the execution manager 20 at step S107A. The execution manager 20 compares the before and after emulated target environment to see if there have been any undesirable changes and transfers the result of the comparison to the transaction rating unit 60. According to another embodiment, the execution manager 20 does not compare the before and after emulated target environment to see if there have been any undesirable changes, the execution manager 20 merely transfers the before and after emulated target environments to the transaction rating unit 60. The transaction rating unit 60 compares the before and after emulated target environment to see if there have been any undesirable changes and determines the transaction confidence value.

As stated above, the transaction rating unit 60 transfers the transaction confidence value (rating) to the execution manager 20 at step S107A. In addition, the transaction rating unit 60 may transfers the transaction confidence value (rating) to a remote threat analysis system (not illustrated), such as a cloud service. The remote threat analysis system receives transaction confidence values for a plurality of transactions and performs threat analysis by analysing the received plurality of transaction confidence values looking for patterns of behaviour that precede compromises of devices and uses machine learning in order to adjust the transaction confidence values of future transactions.

A transaction rating unit 60 may receive and evaluate health data and determine transaction confidence values for a plurality of different execution managers 20.

The transaction confidence value ($T_{CV}$) is a value assigned to the transaction indicating a level of trust attributed to the transaction, i.e. whether any negative consequences are likely to occur as a result of executing the transaction in the target environment. The transaction confidence value ($T_{CV}$) is determined based on an emulation confidence value ($E_{CV}$) which indicates whether any of the pre-defined events and/or internal state changes have occurred at the emulator and/or whether any other negative consequences have been detected as a result of executing the transaction at the emulator. The transaction confidence value ($T_{CV}$) may also be determined based on the emulation confidence value ($E_{CV}$) and a source confidence value ($S_{CV}$) which indicates a level of trust attributed to the source.

The transaction confidence value ($T_{CV}$) may be defined using the following equation:

$$T_{CV} = E_{CV} \times S_{CV} \qquad \text{Equation 1.}$$

When the transaction confidence value meets or exceeds a pre-determined transaction confidence threshold (TC), then the transaction is considered to be trusted, i.e. Equation 2 must be satisfied:

$$T_{CV} \geq TC \qquad \text{Equation 2.}$$

When it is determined that the transaction is trusted, either by the execution manager 20 or the transaction rating unit 60, the execution manager 20 transfers the transaction to the target environment 30 for processing at step S108, as illustrated in FIGS. 1A and 1B. An explicit authorisation to execute the transaction may be transmitted by the execution manager 20 to the target environment 30 with the transaction. In addition, one or more of the confidence values (i.e. $T_{CV}$, $E_{CV}$, $S_{CV}$) and/or a source identifier identifying the untrusted source of the transaction may be transmitted by the execution manager 20 to the target environment 30.

The transaction is executed at the target environment 30 at step S109, and if appropriate the results of the transaction are transmitted to the source 10 at step S110, as illustrated in FIGS. 1A and 1B. A log of the "successful" transaction together with its associated transaction confidence value, source identifier and the reasons for the success may be stored at the execution manager 20 for audit and administration purposes, and/or may be sent to a cloud service for threat analysis.

As stated above, it is determined whether pre-defined events and/or internal state changes occur at the emulated target environment which indicate undesirable behaviour and/or any other negative consequences arising from processing the transaction. However, the presence or absence of pre-defined events and/or internal state changes occurring at the emulated target environment does not necessarily indicate that the transaction is not to be trusted. The emulation confidence value ($E_{CV}$) may be set to indicate the extent of the undesirable behaviour and/or negative consequence. Therefore, it may be determined when evaluating the health of the emulator at step S107 that the undesirable behaviour and/or negative consequence may only have minor implications at the target environment and thus the transaction may be executed at the target environment 30, i.e. although undesirable behaviour is detected it is minor and thus the transaction confidence value meets or exceeds a pre-determined transaction confidence threshold.

Figure 1C:
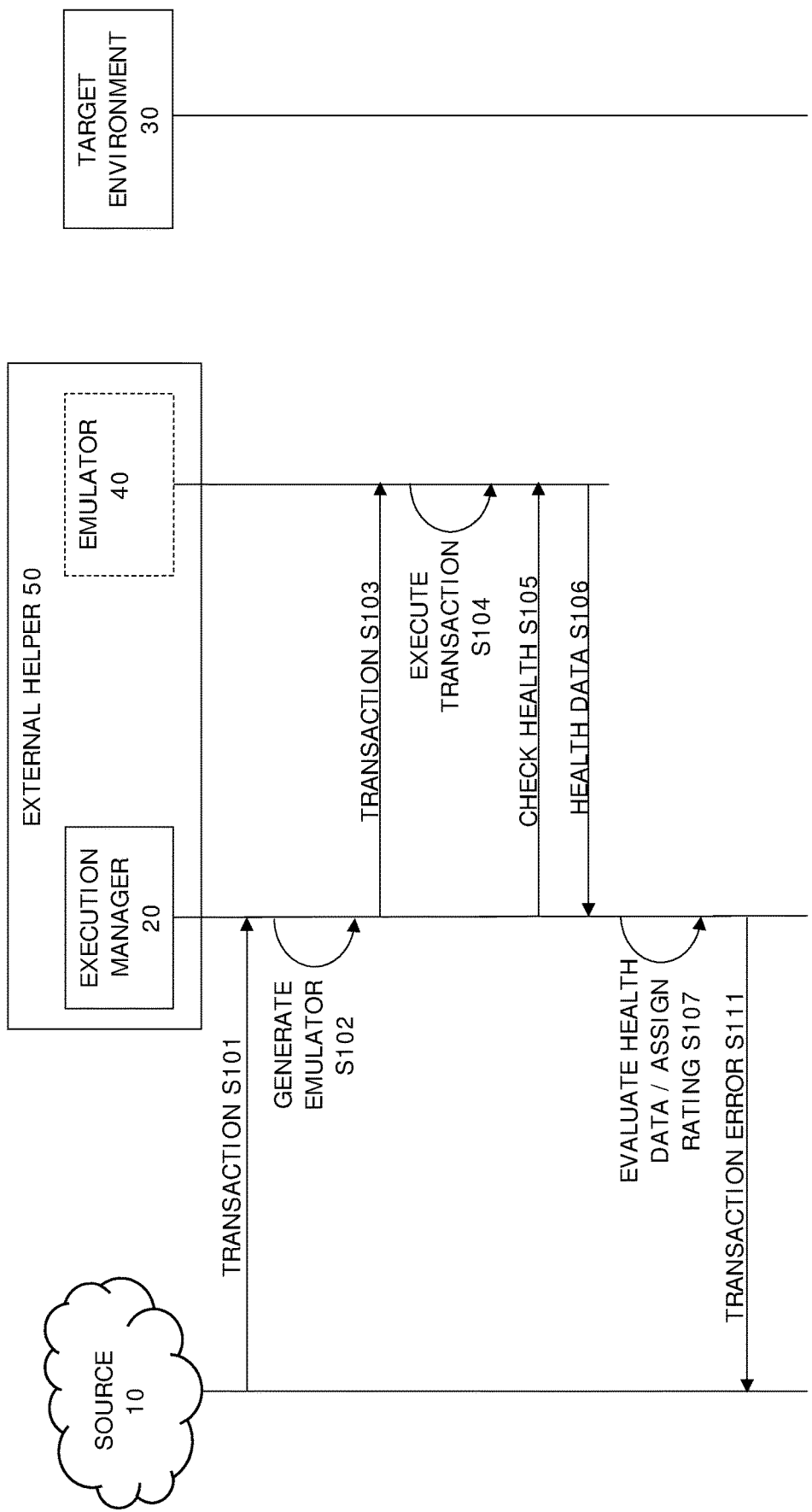
FIG. 1C illustrates schematically an external helper for processing a transaction from an untrusted source.
Figure 1D:
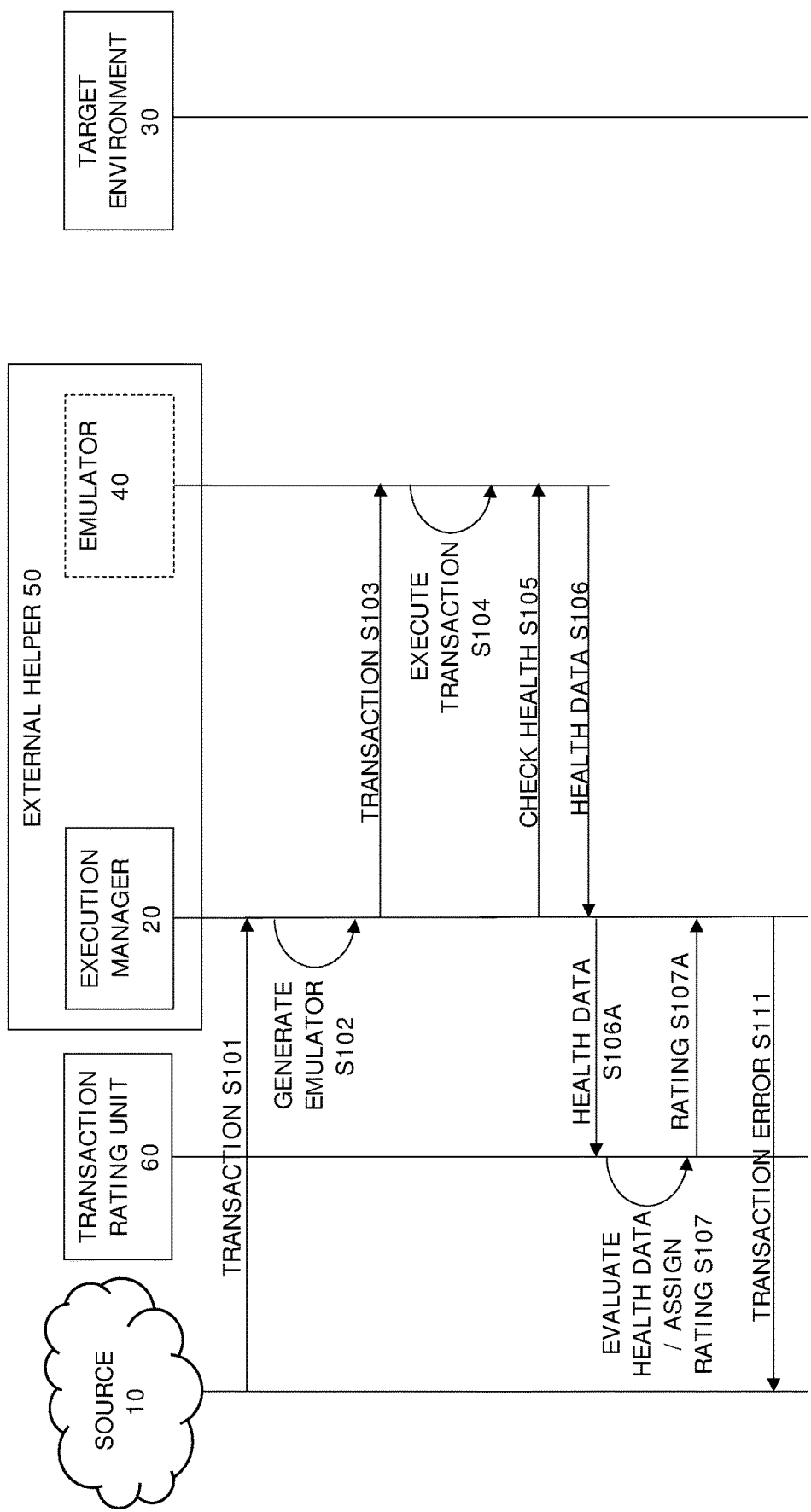
FIG. 1D illustrates schematically an external helper for processing a transaction from an untrusted source

FIGS. 1C and 1D illustrates schematically the same arrangement as illustrated in FIGS. 1A and 1B. Steps S101 to S107 of FIG. 1C are the same as those described above with reference to FIG. 1A and steps S101 to S107A of FIG. 1D are the same as those described above with reference to FIG. 1B. However, according to FIGS. 1C and 1D, it is determined that the transaction confidence value is below the pre-determined transaction confidence threshold (i.e. $T_{CV} < TC$). When the transaction confidence value is below the pre-determined transaction confidence threshold, the transaction is considered to be not trusted, and is not transferred to the target environment 30 for processing. According to one embodiment, the execution manager 20 denies execution of the transaction at the target environment and the source 10 may be informed that the transaction has "failed". For example, an error message is sent to the source at step S111 of FIGS. 1C and 1D. However, the source may not be informed of the reasons why the transaction failed. A log of the "failed" transaction together with its associated confidence values (i.e. $T_{CV}$, $E_{CV}$, $S_{CV}$), source identifier and the reasons for the failure may be stored at the execution manager 20 for audit and administration purposes, and/or may be sent to a cloud service for threat analysis.

According to one embodiment, the execution manager 20 may evaluate the transaction confidence value at step S107 and determine whether the transaction is trusted. According to another embodiment, the transaction rating unit 60 may evaluate the transaction confidence value at step S107 to determine whether the transaction is trusted, and then transfer to the execution manager 20 the result of the determination at step S107A. According to another embodiment, the execution manager 20 may evaluate the transaction confidence value received from the transaction rating unit 60 and determine whether the transaction is trusted.

When a transaction has failed, then the untrusted source may be "banned", such that the execution manager will reject all transactions from that source. The source may then be required to establish trust before the execution manager will process its transactions. According to one embodiment, the "banned" source may be required to submit cryptographic verification or a proof of work before the execution manager will process its transactions again. Even when a source has submitted cryptographic verification or a proof of work, the execution manager may still emulate each transaction issued from the source.

The emulator 40 may be terminated following completion of the emulated transaction/portion of the transaction.

The execution manager 20 may create an emulator 40 on the fly as required. The generated emulator may emulate the functionality of one or more components of the target environment 30 or the entire target environment 30, dependent on the transaction received. Therefore, the emulator 40 created by the execution manager 20 may vary dependent on the requirements of the transaction received. In addition, the external helper 50 may be provided to protect more than one target environments 30 of different types, and consequently the generated emulator 40 may vary dependent on the target environment 30 which is to be emulated. Alternatively, the external helper 50 may be provided to protect only one target environment 30, or one or more target environments of the same type and the external helper 50 comprises one or more emulators generated prior to a transaction being received. According to this embodiment, step S102 may not be required.

An external helper 50 may be provided to protect one or more target environments of the same or different types. When an external helper is provided to protect a plurality of target environments of the same type, and a source issues the same transaction to each of the target environments, the external helper 50 may emulate the transaction once. Assuming the transaction confidence value meets or exceeds a pre-determined transaction confidence threshold (TC), the external helper 50 may then transfer the transaction to each of the plurality of target environments. For example, a source may issue an instruction to be executed at a plurality of temperature sensors protected by the external helper. The external helper emulates the transaction and confirms that there are no negative consequences, so transfers the instruction to the plurality of temperature sensors for execution. Consequently, an external helper may not need to be provided for each individual target environment.

FIG. 2A illustrates schematically a target environment 130 comprising an execution manager 20 as one of its components. According to this embodiment, since the target environment 130 comprises an execution manager 20, an external helper is not required.

As illustrated in FIG. 2A, a transaction is received at the target environment 130 from an untrusted source 10 at step S201. The execution manager 20 may create an emulator 40, on the fly, to emulate the functionality of one or more components of the target environment 130 as required, dependent on the transaction received. Therefore, the emulator 40 created by the execution manager 20 may vary dependent on the requirements of the transaction received at step S201. Alternatively, the target environment 130 may comprise one or more emulators generated prior to a transaction being received emulating the functionality of one or more components of the target environment 130. One or more of the emulators 40 are then selected to process the received transaction.

At step S202, the transaction is passed to the newly created or pre-generated emulator 40, and at least a portion of the transaction is executed at the emulator 40 at step S203. The execution manager 120 checks the health of the emulator at steps S204 and S205. For example, the execution manager 20 monitors the resultant system effects to detect the presence or absence of pre-defined events and/or internal state changes which indicate undesirable behaviour and/or any other negative consequences arising from processing the transaction, in order to determine whether processing the transaction results in undesirable behaviour occurring at the emulated target environment.

A transaction confidence value or rating ($T_{CV}$) is assigned to the transaction at step S206. The transaction confidence value ($T_{CV}$) is a value assigned to the transaction indicating a level of trust attributed to the transaction, i.e. whether any negative consequences are likely to occur as a result of executing the transaction in the target environment and how detrimental the negative consequences are deemed to be.

The transaction confidence value is evaluated by the execution manger 20 at step S206. When the transaction confidence value meets or exceeds a pre-determined transaction confidence threshold (i.e. $T_{CV} \geq TC$), then the transaction is considered to be trusted. When it is determined that the transaction is trusted, then the transaction is processed at the target environment 130 at step S207. If appropriate, the results of the transaction are transmitted to the source 10 at step S208.

A log of the "successful" transaction together with its associated confidence values (i.e. $T_{CV}$, $E_{CV}$, $S_{CV}$), source identifier and the reasons for the success may be stored at the execution manager 20 for audit and administration purposes and/or may be sent to a cloud service for threat analysis.

Figure 2B:
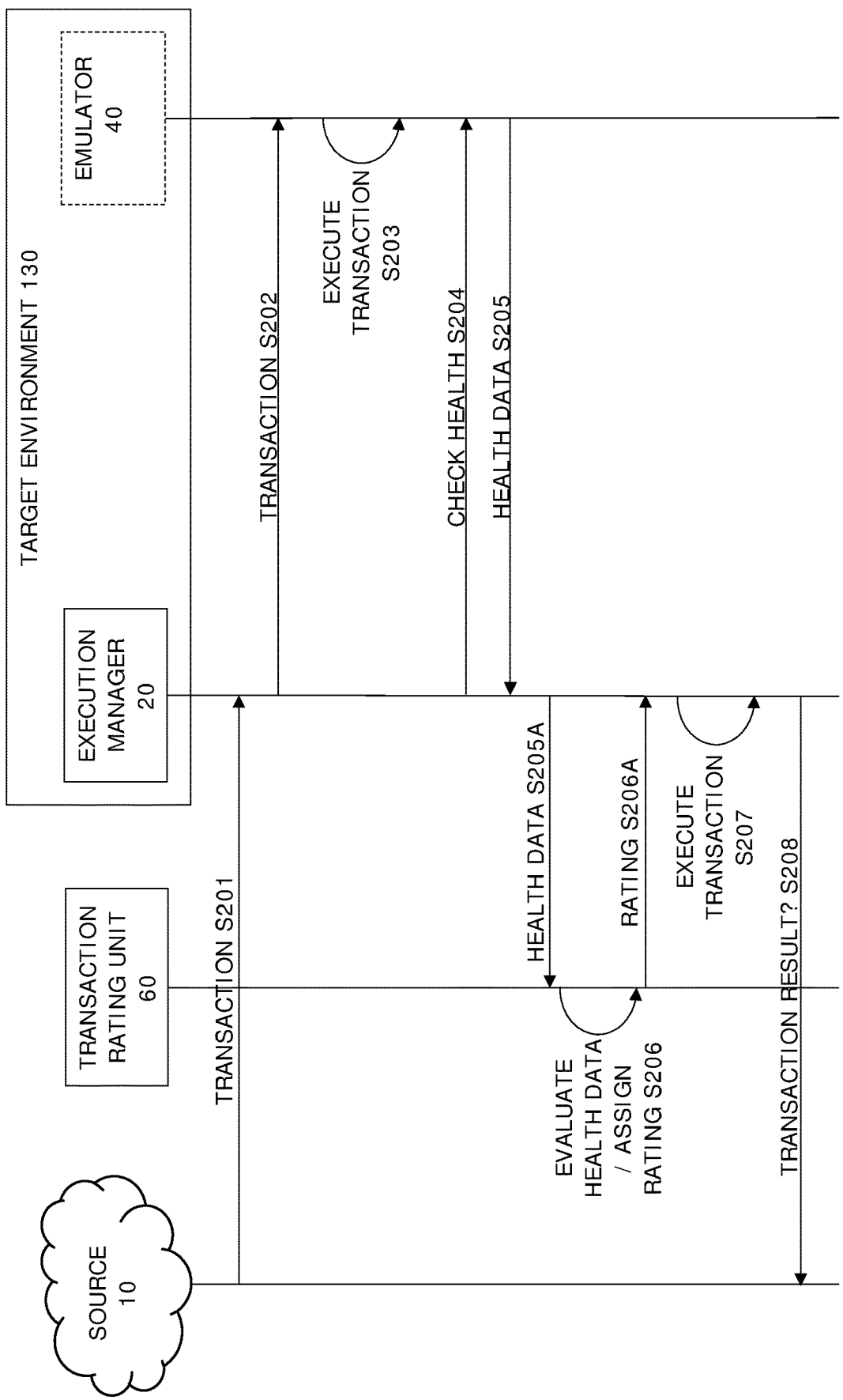
FIG. 2B illustrates schematically a target environment comprising an execution manager as one of its components

According to another embodiment, illustrated in FIG. 2B, a transaction rating unit 60, separate from the execution manager 20, evaluates the health data and determines a transaction confidence value for the transaction at step S206. Similar to FIG. 1B described above, the execution manager 20 transfers the health data to the transaction rating unit 60 for inspection at step S205A, and the transaction rating unit 60 transfers the transaction confidence value (rating) to the execution manager 20 at step S206A.

Figure 2C:
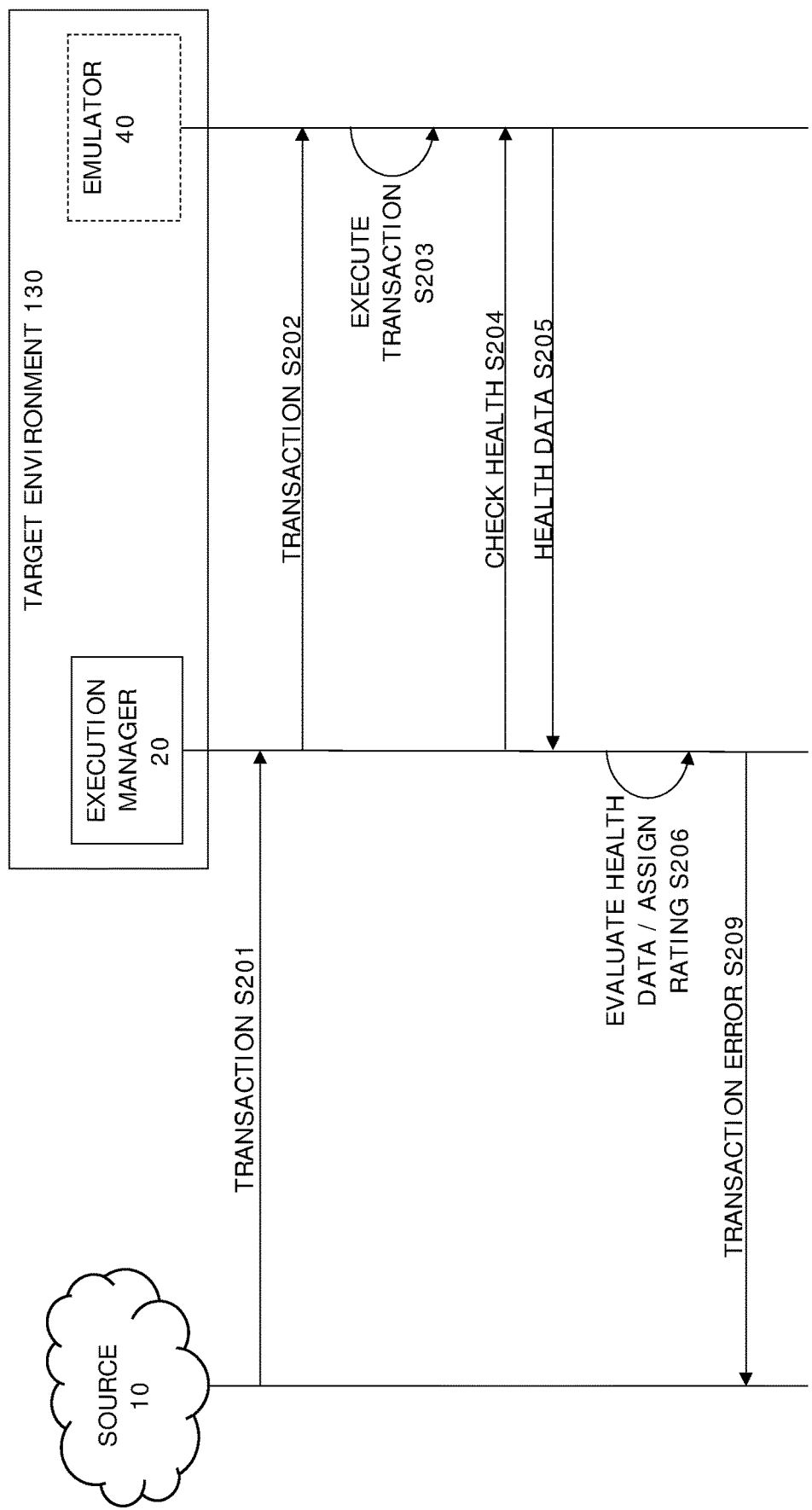
FIG. 2C illustrates schematically a target environment comprising an execution manager as one of its components.
Figure 2D:
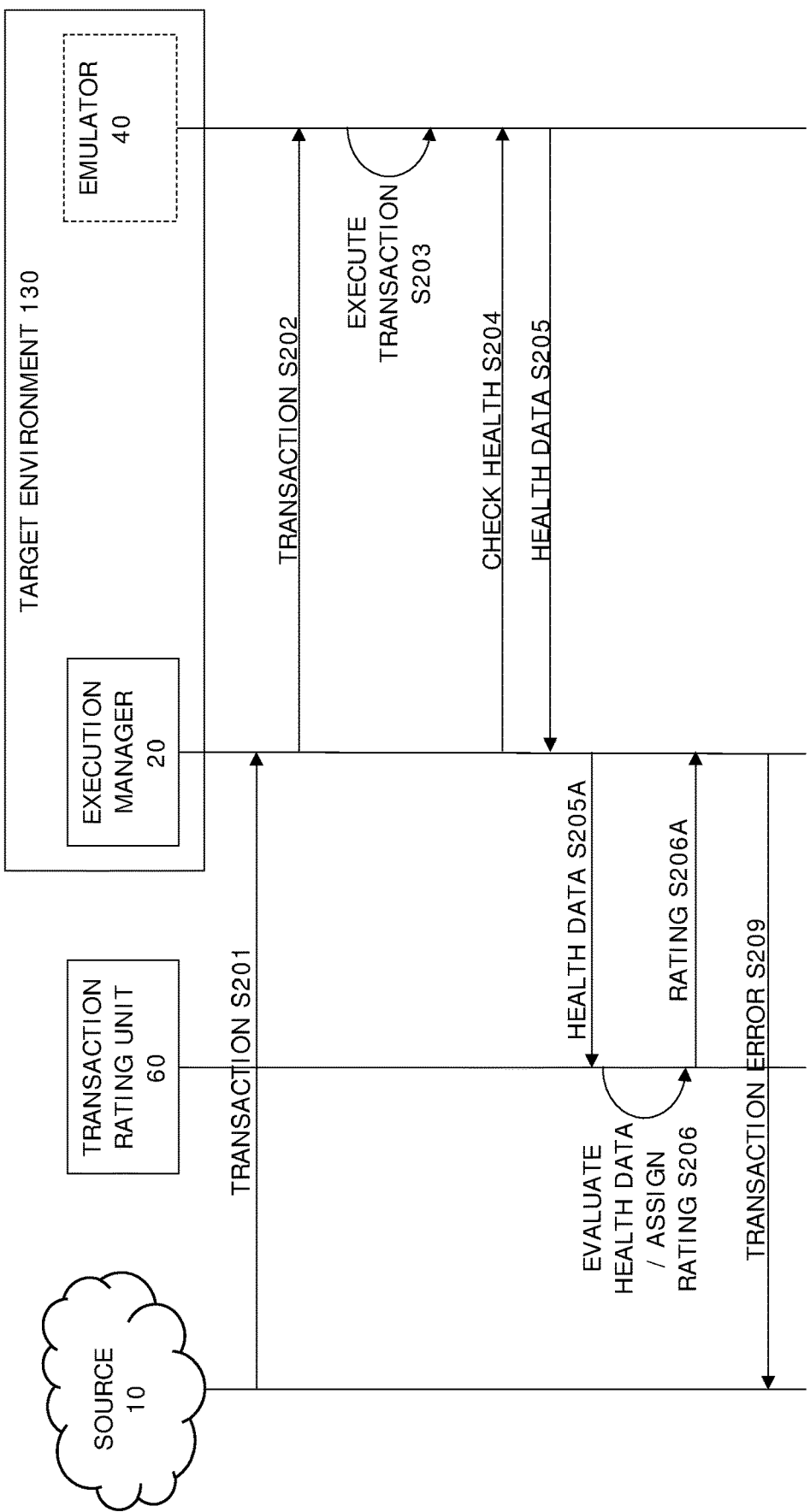
FIG. 2D illustrates schematically a target environment comprising an execution manager as one of its components.

Similar to FIG. 2A, FIG. 2C also illustrates schematically a target environment 130 comprising an execution manager 20 as one of its components. Steps S201 to S206 of FIG. 2C are the same as those described above with reference to FIG. 2A. In addition, similar to FIG. 2B, FIG. 2D illustrates schematically a target environment 130 comprising an execution manager 20 as one of its components. Steps S201 to S206 of FIG. 2D are the same as those described above with reference to FIG. 2B. However, according to FIGS. 2C and 2D, it is determined that the transaction confidence value is below the pre-determined transaction confidence threshold (i.e. $T_{CV} < TC$). When the transaction confidence value is below the pre-determined transaction confidence threshold, the transaction is considered to be not trusted, and is not executed at the target environment 130. According to one embodiment, the source 10 may be informed that the transaction has "failed" at the target environment. For example, an error message may be sent to the source at Step S209 of FIGS. 2C and 2D. However, the source may not be informed of the reasons why the transaction failed. A log of the "failed" transaction together with its associated confidence values (i.e. $T_{CV}$, $E_{CV}$, $S_{CV}$), source identifier and the reasons for the failure may be stored at the execution manager 20 for audit and administration purposes and/or may be sent to a cloud service for threat analysis.

According to one embodiment, the execution manager 20 may evaluate the transaction confidence value at step S206 and determine whether the transaction is trusted. According to another embodiment, the transaction rating unit 60 may evaluate the transaction confidence value at step S206 to determine whether the transaction is trusted, and then transfer to the execution manager 20 the result of the determination at step S206A. According to another embodiment, the execution manager 20 may evaluate the transaction confidence value received from the transaction rating unit 60 and determine whether the transaction is trusted.

The emulator 40 may be terminated following completion of the emulated transaction/portion of the transaction. The execution manager 20 may generate an emulator 40 on the fly as required. Alternatively, the emulator(s) may be generated prior to a transaction being received. The generated emulator may emulate the functionality of one or more components of the target environment 30 or the entire target environment 30, dependent on the transaction received and the complexity of the target environment. Therefore, the emulator 40 generated by the execution manager 20 may vary dependent on the requirements of the transaction received and the target environment. Furthermore, depending on the complexity of the target environment, it may not be efficient for an emulator is emulate the whole target environment. Accordingly, a plurality of emulators may be provided, each emulator emulating a portion of the target environment.

The transaction confidence value should meet or exceed a pre-determined transaction confidence threshold (TC) in order for the transaction to be performed in the target environment. The pre-determined transaction confidence threshold may vary dependent on the type of transaction to be performed and the vulnerability of the target environment. For example, firmware updates, administrative tasks and configuration changes may have different thresholds associated with them dependent on the deemed importance of the transaction, and the vulnerability of the target environment. Furthermore, the pre-determined transaction confidence threshold may vary dependent on the source. For example, when the source is known, the transaction confidence threshold may be set to a different level than when the source is unknown.

As stated above, the transaction confidence value ($T_{CV}$) may be determined based on an emulation confidence value ($E_{CV}$) which indicates whether any of the pre-defined events and/or internal state changes have occurred at the emulator and/or whether any other negative consequences have been detected as a result of executing the transaction at the emulator. According to another embodiment, the transaction confidence value ($T_{CV}$) may be determined based on the emulation confidence value ($E_{CV}$) and a source confidence value ($S_{CV}$). The source confidence value ($S_{CV}$) indicates a level of trust attributed to the source by the execution manager 20 and/or the transaction rating unit 60, if present. The level of trust attributed to a source may increase as a result of the number of transactions a source has issued to a target environment, which have passed the pre-determined transaction confidence threshold (TC), and all of which have been performed at the target environment without undesirable results.

An unknown untrusted source may initially have a source confidence value of almost zero (the source confidence value may not have a value of zero, because if the source confidence value of an unknown untrusted source was zero, then no transactions would be processed from the unknown untrusted source regardless of the results of the emulated transaction). A known untrusted source which has issued one or more transactions to a target environment, all of which have passed the pre-determined transaction confidence threshold (TC), and all of which have been performed at the target environment without undesirable results may be attributed a higher source confidence value ($S_{CV}$), than an unknown untrusted source. Consequently, the resultant transaction confidence value ($T_{CV}$) of the known untrusted source will be higher than if the same transaction originated from an unknown untrusted source. The source confidence value ($S_{CV}$) may be used together with the results of processing the transaction at the emulator ($T_{CV}$) to determine the transaction confidence value ($T_{CV}$).

The source confidence value attributed to an untrusted source may be increased whenever the untrusted source issues a transaction to the target environment, which passes the pre-determined transaction confidence threshold, and which has been performed at the target environment without undesirable results.

The source confidence value ($S_{CV}$) may be re-determined whenever a new event occurs, such as the source issuing a transaction to a target environment, which passes the pre-determined transaction confidence threshold (TC), and which is performed at the target environment without undesirable results. The source confidence value ($S_{CV}$) which is determined as a result of transactions should comply with Equation 3.

$$S_{CV} = \min(T, N \times C_T) \qquad \text{Equation 3.}$$

where:
T=maximum confidence that can be obtained for processing transactions;
N=number of transactions;
$C_T$=confidence increase per transaction.

However, in order to avoid apportioning too much confidence to an untrusted source, the source confidence value for an untrusted source may only be increased to a predetermined source transaction limit ($S_{TL}$) as a result of successful transactions. Advanced verification of the source may be required before the source gains further trust from the execution manager/transaction rating unit. One example of an advanced verification may be submitting a signed certificate of trust to the execution manager/transaction rating unit. This may result in the source confidence value being increased above the source transaction limit ($S_{TL}$) since additional trust has been gained by virtue of the signed certificate. However, the source confidence value may only be increased to a predetermined source certificate limit ($S_{CL}$) as a result of the signed certificate. Further advanced verification of the source may be required before the source gains further trust from the execution manager/transaction rating unit, such as cryptographic verification of the source or proof of work.

When the transaction confidence value ($T_{CV}$) is determined based on the results of processing the transaction at the emulator ($E_{CV}$) alone, then only basic operations may be allowed to be executed at the target environment. When the transaction confidence value ($T_{CV}$) is determined based on the results of processing the transaction at the emulator ($E_{CV}$) together with a source confidence value ($S_{CV}$) less than or equal to the predetermined source transaction limit, i.e. $S_{CV} \geq S_{TL}$, then the source may only be allowed to perform basic operations at the target environment. When the transaction confidence value ($T_{CV}$) is determined based on the results of processing the transaction at the emulator ($E_{CV}$) together with a source confidence value ($S_{CV}$) which is greater than the predetermined transaction limit, i.e. $S_{CV} > S_{TL}$, for example when the source is a known untrusted source, which has successfully submitted a signed certificate of trust, then the source may be allowed to perform administrative tasks at the target environment. When the transaction confidence value ($T_{CV}$) is determined based on the results of processing the transaction at the emulator ($E_{CV}$) together with a source confidence value ($S_{CV}$) which is greater than the predetermined certificate limit, i.e. $S_{CV} > S_{CL}$, for example when the source is a known untrusted source, which has successfully completed cryptographic verification, then the source may be allowed to perform firmware updates at the target environment.

Additionally or alternatively, an execution manager/transaction rating unit/user may increase a sources source confidence value ($S_{CV}$) as a result of the source confidence value determined for that source at a second/other execution managers/transaction rating units/users. A first execution manager/transaction rating unit/user informs one or more other execution managers/transaction rating units/users of the source confidence value it has determined for the source. For example, a source may have issued multiple transactions to a first execution manager, all of which have passed the pre-determined transaction confidence threshold (TC), and all of which have been performed at a target environment without undesirable results. Consequently, the source may have a source confidence value p (i.e. $S_{CV} = p$) determined by the first execution manager. The first execution manager may inform a second/further execution manager of the source confidence value p it has attributed to the source, such that the second/further execution manager may adjusted the source confidence value it attributes to the source.

For a second execution manager/transaction rating unit/user to accept the source confidence value determined at the first execution manager/transaction rating unit/user, the second execution manager/transaction rating unit/user must trust the first execution manager/transaction rating unit/user.

The source confidence value attributed to the source at the second execution manager by virtue of the source confidence value determined for the source at the first execution manager may be the same as the source confidence value determined for the source at the first execution manager. For example, a source may issue the same transaction to a plurality of target environments. Following successful emulation and execution of the transaction at a first target environment, the first execution manager provided for the first target environment may share the determined source confidence value with the plurality of target environments.

Alternatively, the source confidence value attributed to the source at a second execution manager by virtue of the source confidence value determined for the source at a first execution manager may be different from the source confidence value determined for the source at the first execution manager. For example, Equation 4 may be satisfied:

$$UserB\ S_{CV}=\max(UserA\ S_{CV}, M \times UserB\ S_{CV})\qquad \text{Equation 4.}$$

where M<1

The second execution manager may determine a source confidence value for the source based on the source confidence value determined for the source at the first execution manager (UserA $S_{CV}$), as well as the source confidence value determined for the source at the second execution manager (UserB $S_{CV}$). In addition, the source confidence value for a source determined at a second execution manager, may not be increased to greater than the source confidence value for the source determined at the first execution manager.

When a transaction rating unit 60 is present, the transaction rating unit 60 may determine a source confidence value for a source as a result of the transactions issued by the source to different target environments.

It is possible for a source confidence value ($S_{CV}$) to be reduced when a source issues a transaction for processing at a target environment, which does not pass the pre-determined transaction confidence threshold (TC), and consequently is not performed at the target environment.

A source confidence value ($S_{CV}$) may be increased and or reduced on a sliding frame, so that older transactions have less weighting when determining a source confidence value ($S_{CV}$). In addition, or alternatively, only the x most recent transactions issued by a source may be used to determine the source confidence value ($S_{CV}$). For example, x=10. In addition, or alternatively, an execution manager may store data regarding only the x most recent transactions issued by a source, such that the source confidence value ($S_{CV}$) is determined using only the most recent transaction data. Alternatively, an execution manager may store data regarding all of the transactions issued by a source.

As stated above, the transaction confidence value ($T_{CV}$) may be determined based on the emulation confidence value ($E_{CV}$) and the source confidence value ($S_{CV}$). Alternatively, the transaction confidence threshold (TC) vary dependent on the source confidence value ($S_{CV}$). For example, Equation 5 may be satisfied:

$$TC_1 = TC \times S_{CV} \qquad \text{Equation 5.}$$

Where $TC_1$ is a source specific transaction confidence threshold. However, since the source confidence value ($S_{CV}$) is a multiplier applied to the emulation confidence value ($E_{CV}$) or transaction confidence threshold (TC), either application is acceptable.

Figure 3:
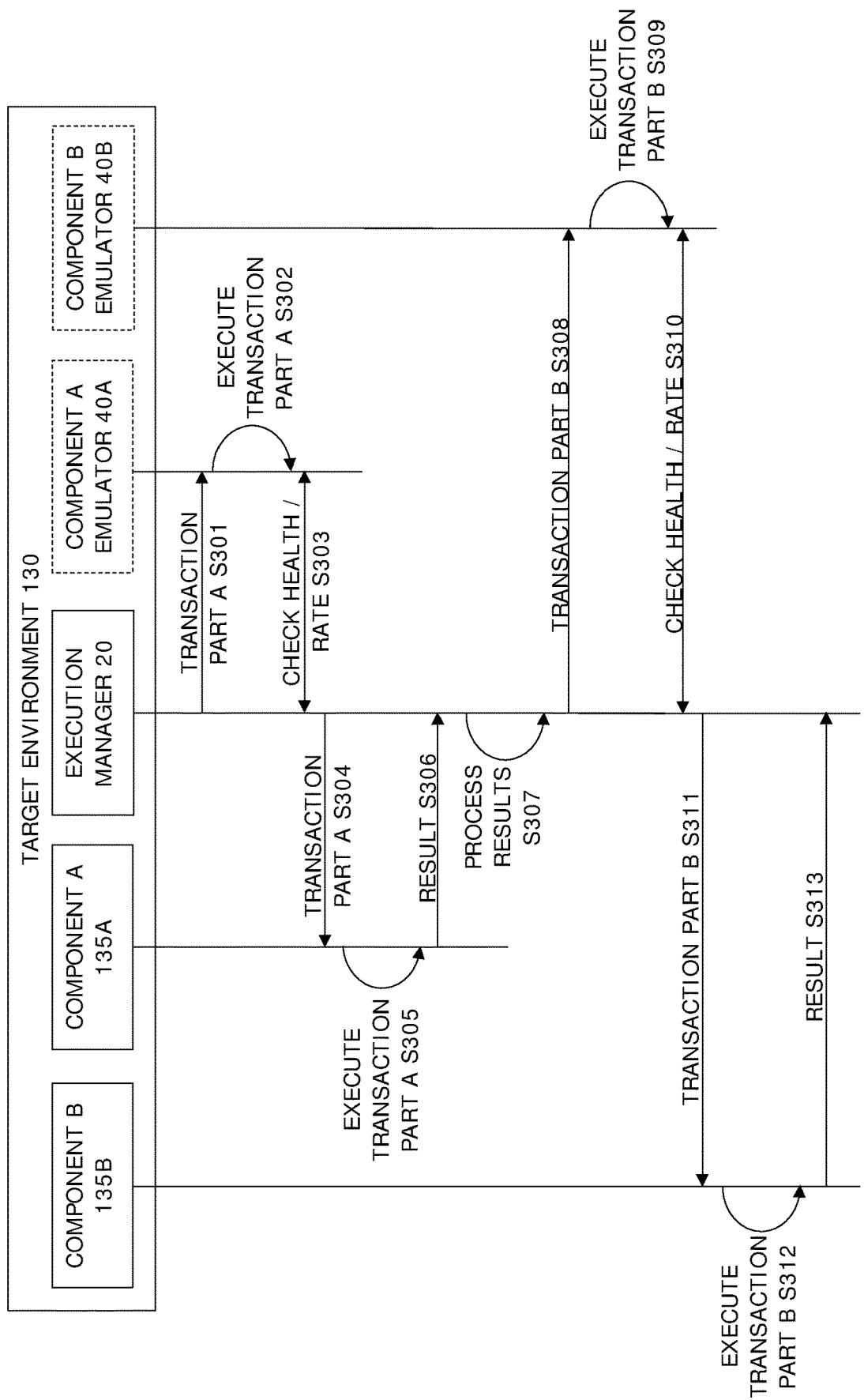
FIG. 3 illustrates schematically processing a transaction comprising two parts.

FIG. 3 illustrates schematically a target environment 130 comprising component A 135A, component B 135B and an execution manger 20. A transaction may comprise more than one step/part to be executed for the transaction to complete. When a transaction, which has two parts, is received from a source (not illustrated), the execution manger 20 directs a first part A of the transaction, which requires component A in order to be executed, to component A emulator 40A at step S301. Transaction part A is executed at the emulator 40A at step S302. The execution manager 20/transaction rating unit 60 if present, checks the health of the emulator 40A and a transaction confidence value (rating) is assigned to the transaction part A at step S303. As with the process described above, when the transaction confidence value meets or exceeds a pre-determined transaction confidence threshold (i.e. $T_{CV}A \geq TC$), the execution manger 20 directs transaction part A to component A 135A at step S304. Transaction part A is processed at the target component A at step S305. The results of executing the transaction part A are transferred to the execution manger 20 at step S306 and processed at step S307.

The results of executing the transaction part A may or may not be required in order to continue with executing the transaction, i.e. the second part B of the transaction. A transaction may require more than one step in order to complete processing, in particular when a transaction is not atomic.

The execution manger 20 directs transaction part B to component B emulator 40B at step S308. Transaction part B is executed at the emulator 40B at step S309. The execution manager 20/transaction rating unit 60 if present, checks the health of the emulator 40B and a transaction confidence value (rating) is assigned to the transaction part B at step S310. As with the process described above, the transaction confidence value assigned to transaction part B is evaluated and when the transaction confidence value meets or exceeds a pre-determined transaction confidence threshold (i.e. $T_{CV}B \geq TC$), the execution manger 20 directs transaction part B to component B 135B at step S311. Transaction part B is processed at the target component B at step S312. The results of executing transaction part B are transferred to the execution manger 20 at step S313.

If appropriate the execution manager 20 may transmit the results of the transaction to the source.

If one or more steps/parts of a transaction to be executed is determined to have a transaction confidence value that is below the pre-determined transaction confidence threshold, then the entire transaction may fail.

As stated above, the execution manager 20 may create the component emulators 40A, 40B, on the fly, as required, dependent on the transaction received. Alternatively, the target environment 130 may comprise the component emulators 40A, 40B, as required to emulate the functionality of the target environment, generated prior to a transaction being received. Furthermore, each component emulator may emulate one or more components/portions of the target environment.

Figure 4:
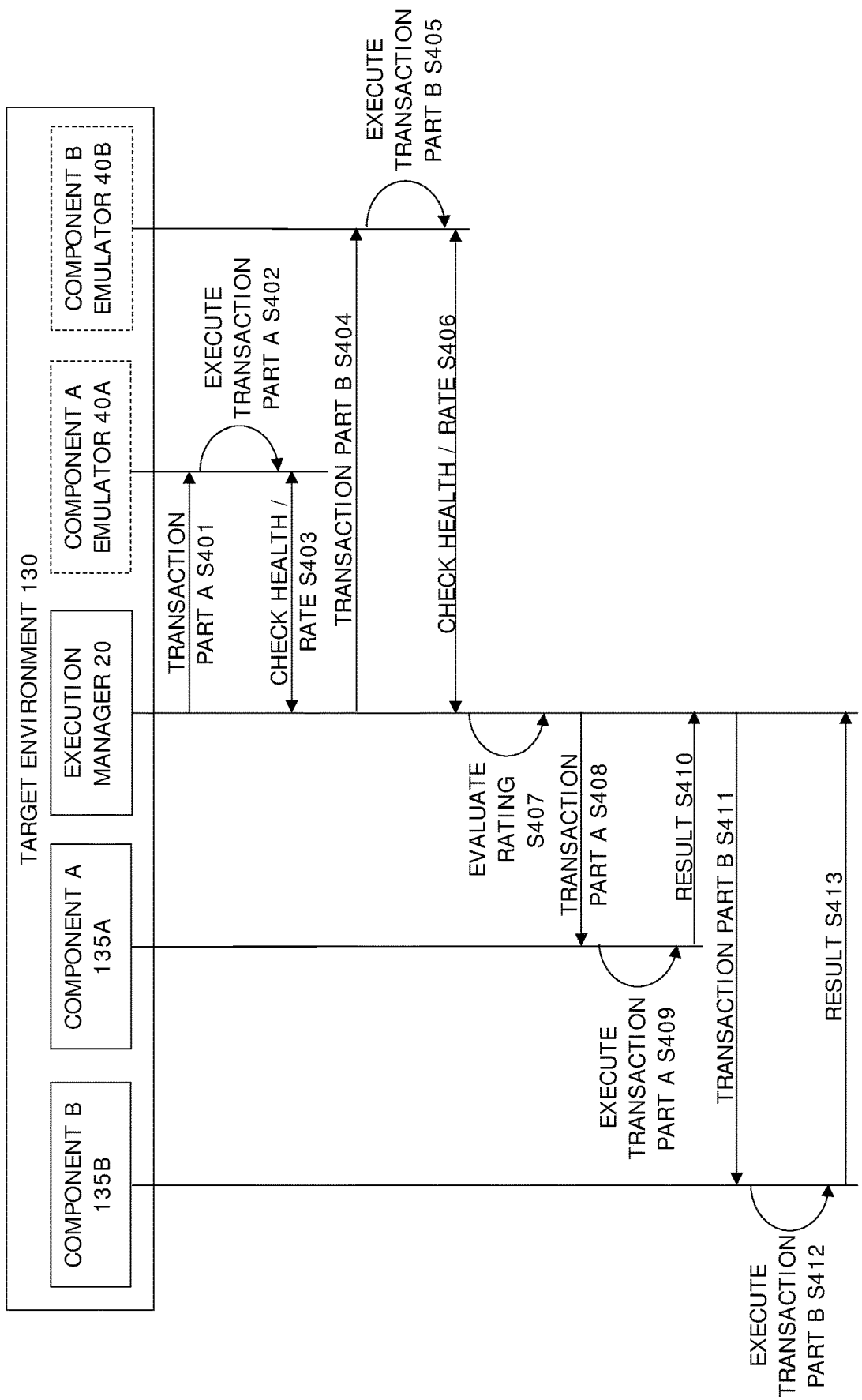
FIG. 4 illustrates schematically processing an atomic transaction comprising two parts.

Alternatively, an overall transaction confidence value ($T_{CV}$) may be determined for an atomic transaction which comprises more than one step/parts. FIG. 4 illustrates schematically processing an atomic transaction comprising two parts.

When a transaction, which has two parts, is received from a source (not illustrated), the execution manger 20 directs a first part A of the transaction, which requires component A in order to be executed, to component A emulator 40A at step S401. Transaction part A is executed at the emulator 40A at step S402. The execution manager 20/transaction rating unit 60 if present, checks the health of the emulator 40A and a transaction confidence value ($T_{CV}A$) is assigned to the transaction part A at step S403. The transaction confidence value ($T_{CV}A$) attributed to transaction part A is determined using Equation 1 above and is determined based on the results of processing the transaction part A at the component A emulator ($E_{CV}A$) together with a source confidence value ($S_{CV}$).

$$T_{CV}A = E_{CV}A \times S_{CV} \qquad \text{Equation 1.}$$

Since the transaction is required to be processed atomically, the execution manger 20 directs transaction part B to component B emulator 40B at step S404. Transaction part B is executed at the emulator 40B at step S405. The execution manager 20/transaction rating unit 60 if present, checks the health of the emulator 40B and a transaction confidence value (rating) is assigned to the transaction part B at step S406.

The transaction confidence value ($T_{CV}B$) attributed to transaction part B is determined using Equation 1 above and is determined based on the results of processing the transaction part B at the component B emulator ($E_{CV}B$) together with the source confidence value ($S_{CV}$).

$$T_{CV}B = E_{CV}B \times S_{CV} \quad \text{Equation 1.}$$

An overall transaction confidence value ($T_{CV}$) attributed to the transaction as a whole is determined at step S407. The overall transaction confidence value ($T_{CV}$) is determined based on the results of processing the transaction part B at the component B emulator ($E_{CV}B$) together with the source confidence value ($S_{CV}$) and the transaction confidence value ($T_{CV}A$) attributed to transaction part A. The overall transaction confidence value ($T_{CV}$) may be determined using Equation 6.

$$T_{CV} = T_{CV}A + (E_{CV}B \times S_{CV}) \quad \text{Equation 6.}$$

Alternatively, Equation 7 may be used to determine an overall transaction confidence value ($T_{CV}$) attributed to a transaction as a whole at step S407.

$$T_{CV} = M \times T_{CV}A + (E_{CV}B \times S_{CV}) \quad \text{Equation 7.}$$

where M is a modifier<1.

Alternatively, Equation 8 may be used to determine an overall transaction confidence value ($T_{CV}$) attributed to a transaction as a whole at step S407.

$$T_{CV} = M \times T_{CV}A + N \times (E_{CV}B \times S_{CV}) \quad \text{Equation 8.}$$

where M is a modifier<1 and where N is a modifier<1.

The overall transaction confidence value ($T_{CV}$) is evaluated by the execution manger 20/transaction rating unit 60, and it is determined if Equation 2 is satisfied.

$$T_{CV} \geq TC \quad \text{Equation 2.}$$

When Equation 2 is satisfied and the overall transaction confidence value $T_{CV}$ meets or exceeds a pre-determined transaction confidence threshold TC, the execution manger 20 directs transaction part A to component A 135A at step S408. Transaction part A is processed at the target component A 135A at step S409 and the results of executing transaction part A are transferred to the execution manger 20 at step S410. The execution manger 20 also directs transaction part B to component B 135B at step S411. Transaction part B is processed at the target component B at step S412 and the results of executing transaction part B are transferred to the execution manger 20 at step S413.

Although FIG. 4 and the above description describes transaction part A being emulated at steps S401 to S403 before transaction part B is emulated at steps S404 to S406, steps S401 to S403 and steps S404 to S406 may be performed contemporaneously. Alternatively, steps S404 to S406 may be performed before steps S401 to S403. In addition, although FIG. 4 and the above description describes transaction part A being processed at steps S408 to S410 before transaction part B is processed at steps S411 to S413, steps S408 to S410 and steps S411 to S413 may be performed contemporaneously. Alternatively, steps S411 to S413 may be performed before steps S408 to S410.

Although FIGS. 3 and 4 illustrates processing a transaction which has two parts, as stated above, a transaction may have one, two, or more than two parts, and these transactions may be processed using the methods and apparatus described herein.

Figure 5:
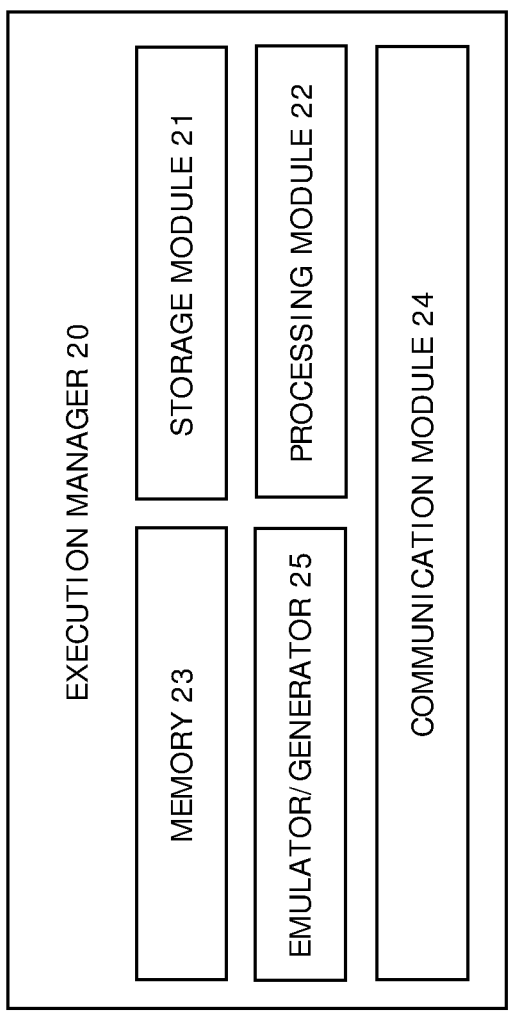
FIG. 5 illustrates schematically an execution manager.

FIG. 5 illustrates schematically an execution manager 20. The execution manager may be provided as part of an external helper or as part of a target environment. The execution manager 20 comprises a communications module 24 for communicating with one or more components of a target environment, one or more sources within its communication range, a transaction rating unit 60 and a cloud service for threat analysis, as required. The communication module 24 may use wireless communication such as WiFi™, Zigbee™, Bluetooth™, 6LoWPAN etc., short range communication such as radio frequency communication (RFID) or near field communication (NFC), cellular networks, such as 3G, 4G, 5G.

The execution manager 20 also comprises a storage module 21 configured to store a log of any "failed" transaction together with its associated transaction confidence value and the reasons for the failure, for audit and administration purposes; determined transaction confidence values ($T_{CV}$), determined source confidence values ($S_{CV}$) and determined emulation confidence values ($E_{CV}$); pre-determined transaction confidence threshold (TC); the rules for determining the above mentioned confidence values; data regarding only the x most recent transactions issued by a source or data regarding all of the transactions issued by a source. The data stored in the storage module 21 may also be uploaded to a cloud service for threat analysis, as required.

Memory 23 may store computer program code to implement the methods described herein. The memory 23 and/or the storage module 21 may comprise a volatile memory such as random access memory (RAM), for use as temporary memory whilst the execution manager 20 is operational. Additionally, or alternatively, the memory 23 and/or the storage module 21 may comprise non-volatile memory such as Flash, read only memory (ROM) or electrically erasable programmable ROM (EEPROM), for storing data, programs, or instructions received or processed by the execution manager 20.

At least one processing module 22 may comprise processing logic to process data and generate output signals in response to the processing, such as instructing one or more emulators/emulator generators 25 to generate an emulator and emulate a transaction at the emulator, determine the above mentioned confidence values, and whether or not the overall transaction confidence value $T_{CV}$ meets or exceeds the pre-determined transaction confidence threshold TC and thus whether a transaction may be performed at a target environment. The processing module 22 is configured to communicate with the storage module 21, memory 23, the communication module 24, and emulator/emulator generator 25.

Figure 6:
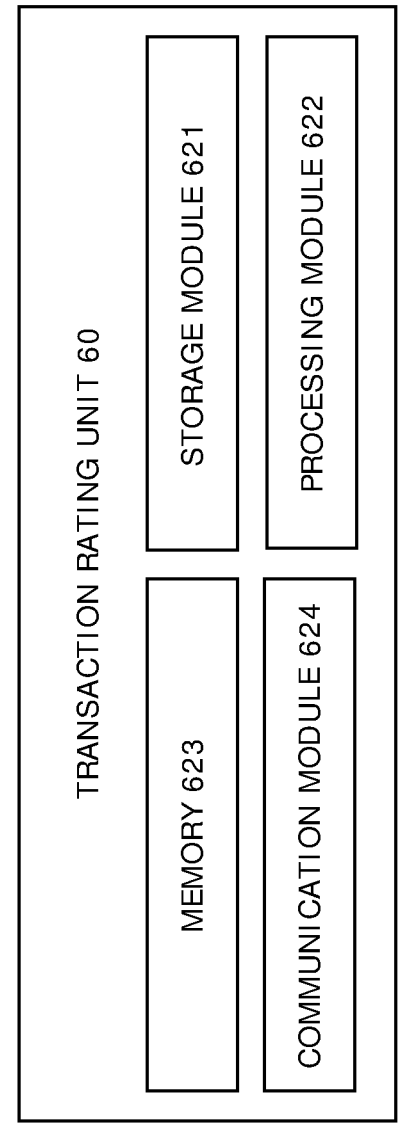
FIG. 6 illustrates schematically a transaction rating unit.

FIG. 6 illustrates schematically a transaction rating unit 60. The transaction rating unit 60 comprises a communications module 624 for communicating with one or more execution managers 20 and a cloud service for threat analysis, as required. The communication module 624 may use wireless communication such as WiFi™, Zigbee™, Bluetooth™, 6LoWPAN etc., short range communication such as radio frequency communication (RFID) or near field communication (NFC), cellular networks, such as 3G, 4G, 5G.

The transaction rating unit 60 also comprises a storage module 621 configured to store determined transaction confidence values ($T_{CV}$), determined source confidence values ($S_{CV}$) and determined emulation confidence values ($E_{CV}$); pre-determined transaction confidence thresholds (TC); the rules for determining the above-mentioned confidence values; data regarding only the x most recent transactions issued by a source or data regarding all of the transactions issued by a source.

Memory 623 may store computer program code to implement the methods described herein. The memory 623 and/or the storage module 621 may comprise a volatile memory such as random access memory (RAM), for use as temporary memory whilst the transaction rating unit 60 is operational. Additionally, or alternatively, the memory 623 and/or the storage module 621 may comprise non-volatile memory such as Flash, read only memory (ROM) or electrically erasable programmable ROM (EEPROM), for storing data, programs, or instructions received or processed by the transaction rating unit 60.

At least one processing module 622 may comprise processing logic to process data and generate output signals in response to the processing, such as determining the abovementioned confidence values, and whether or not the transaction confidence value $T_{CV}$ meets or exceeds the predetermined transaction confidence threshold TC. The processing module 622 is configured to communicate with the storage module 621, memory 623 and the communication module 624.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages. For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

As will be appreciated from the foregoing specification, techniques are described providing a computer implemented method of processing a transaction to mitigate undesirable behaviour occurring at an intended target environment resulting from processing the transaction.

In embodiments, the method further comprises determining a transaction confidence value ($T_{CV}$) based on the first emulation confidence value ($E_{CV}$).

In embodiments, the method further comprises determining a source confidence value ($S_{CV}$) for a source of the transaction; and determining a transaction confidence value ($T_{CV}$) based on the first emulation confidence value ($E_{CV}$) and the source confidence value ($S_{CV}$).

In embodiments, the method further comprises determining a second emulation confidence value ($E_{CV}$) relating to execution, in the emulated environment, of a second different portion of the transaction, the second emulation confidence value for use in determining whether to execute the transaction in the target environment.

In embodiments, the method further comprises determining a transaction confidence value ($T_{CV}$) based on the first emulation confidence value ($E_{CV}$) and the second emulation confidence value ($E_{CV}$).

In embodiments, the method further comprises determining a source confidence value ($S_{CV}$) for a source of the transaction; and determining a transaction confidence value ($T_{CV}$) based on the first emulation confidence value ($E_{CV}$), the second emulation confidence value ($E_{CV}$) and the source confidence value ($S_{CV}$).

In embodiments, the execution manager determines the confidence value(s).

In embodiments, a transaction rating unit determines the confidence value(s).

In embodiments, the transaction rating unit is remote from the execution manager.

In embodiments, the method further comprises comparing the transaction confidence value to a pre-determined transaction confidence threshold to determine whether to execute the transaction in the target environment.

In embodiments, the method further comprises, in response to determining whether to execute the transaction in the target environment, logging at least one reason for the determination.

In embodiments, the method further comprises storing, at the execution manager, associated with the transaction, one or more of the confidence values and/or a source identifier identifying a source of the transaction.

In embodiments, the method further comprises transferring the transaction to the target environment for execution when the transaction confidence value is equal to or greater than the pre-determined transaction confidence threshold.

In embodiments, the method further comprises denying execution of the transaction in the target environment when the transaction confidence value is less than the pre-determined transaction confidence threshold.

In embodiments, the method further comprises denying execution of any further transaction received from a source of the denied transaction.

In embodiments, the method further comprises updating the source confidence value associated with the transaction based on the emulation confidence value associated with the transaction.

In embodiments, the method further comprises updating the source confidence value associated with the transaction based on advanced verification of the source of the transaction.

In embodiments, the method further comprises updating the source confidence value associated with the transaction based on a source confidence value of the source received from another execution manager or transaction rating unit.

In embodiments, the method further comprises generating the emulated environment in response to receiving the transaction to be executed.

In embodiments, the method further comprises storing, at the execution manager, one or more of: the transaction confidence value; the first emulation confidence value; the second emulation confidence value; the source confidence value; the determination as to whether to execute the transaction in the target environment; the at least one reason for the determination; the source identifier; and/or whether the transaction was executed successfully in the target environment.

In embodiments, the method further comprises transmitting, to a remote threat analysis system, one or more of: the transaction confidence value; the first emulation confidence value; the second emulation confidence value; the source confidence value; the determination as to whether to execute the transaction in the target environment; the at least one reason for the determination; the source identifier; and/or whether the transaction was executed successfully in the target environment.

Techniques are also described providing a system for processing a transaction to mitigate undesirable behaviour occurring at an intended target environment resulting from processing the transaction.

In embodiments, the target environment is provided remote from the execution manager and the transaction rating unit.

In embodiments, the target environment is for receiving the transaction in response to the execution manager determining that the transaction may be executed in the intended remote target environment, and for executing the transaction.

In embodiments, the execution manager further transmits an authorisation to execute the transaction to the target environment.

In embodiments, the execution manager further transmits one or more of the confidence values and/or a source identifier associated with the transaction to the target environment.

In embodiments, the execution manager further executes in an emulated environment, a second different portion of the transaction; the transaction rating unit determines a second emulation confidence value relating to the execution, in the emulated environment, of the second different portion of the transaction based on the presence or absence of any monitored pre-defined events and/or internal state changes, wherein the first emulation confidence value and the second emulation confidence value are used in determining whether to execute the transaction in the target environment; and the threat analysis system receives a plurality of first emulation confidence values and second emulation confidence values for a plurality of transactions and adjusts the first emulation confidence values and second emulation confidence values for future transactions based on the plurality of first emulation confidence values and second emulation confidence values.

In embodiments, the transaction rating unit further determines a transaction confidence value based on the first emulation confidence value and the second emulation confidence value.

The invention claimed is:

1. A computer implemented method of processing a transaction that mitigates a malicious attack occurring at an intended target environment resulting from processing the transaction, the computer implemented method comprising:

receiving, at an execution manager, a transaction to be executed, the transaction comprising at least two portions;

executing, in an emulated environment, a first portion of the transaction and monitoring the emulated environment for presence of pre-defined events and/or internal state changes indicative of the malicious attack;

determining a first emulation confidence value ($E_{CV}$) relating to the first portion of the transaction based on the presence or absence of any monitored pre-defined events and/or internal state changes;

determining a source confidence value ($S_{CV}$) for a source of the transaction;

determining a first transaction confidence value ($T_{CV}v$) based on the first emulation confidence value ($E_{CV}$), varying a transaction confidence threshold based on the source confidence value ($S_{CV}$); and comparing the first transaction confidence value to the transaction confidence threshold to determine whether to execute the first portion of the transaction in the target environment;

responsive to determining that the first transaction confidence value exceeds the transaction confidence threshold, transferring the first portion of the transaction to the target environment for execution;

receiving from the target environment a result of executing the first portion of the transaction;

responsive to determining successful execution of the first portion at the target environment based on the result of executing the first portion of the transaction, executing, in an emulated environment, a second portion of the transaction and monitoring the emulated environment for the presence of pre-defined events and/or internal state changes indicative of the malicious attack;

determining a second emulation confidence value ($E_{CV}$) relating to the second portion of the transaction based on the presence or absence of any monitored pre-defined events and/or internal state changes;

determining a second transaction confidence value ($T_{CV}$) based on the second emulation confidence value ($E_{CV}$);

comparing the second transaction confidence value to the transaction confidence threshold to determine whether to execute the second portion of the transaction in the target environment; and responsive to determining that the second transaction confidence value exceeds the transaction confidence threshold, transferring the second portion of the transaction to the target environment for execution, wherein the first portion of the transaction is transferred to the target environment before assessing a safety of the second portion of the transaction or emulating a second portion of the transaction in response to successful execution of the first portion at the target environment.

2. The computer implemented method of claim 1, wherein the execution manager determines the first emulation confidence value.

3. The computer implemented method of claim 1, wherein a transaction rating unit determines the first emulation confidence value.

4. The computer implemented method of claim 3, wherein the transaction rating unit is remote from the execution manager.

5. The computer implemented method of claim 1, further comprising:
for each portion of the transaction, in response to determining whether to execute the portion of the transaction in the target environment, logging at least one reason for the determination.

6. The computer implemented method of claim 1, further comprising:
storing, at the execution manager, associated with the transaction, one or more of the first emulation confidence value, the second emulation confidence value and/or a source identifier identifying the source of the transaction.

7. The computer implemented method of claim 1, further comprising:
for each portion of the transaction, denying execution of the portion of the transaction in the target environment when the associated transaction confidence value is less than the pre-determined transaction confidence threshold.

8. The computer implemented method of claim 7, further comprising:
denying execution of any further transaction received from a source of the denied transaction.

9. The computer implemented method of claim 1, further comprising:
updating a source confidence value associated with the transaction based on the first emulation confidence value associated with the transaction.

10. The computer implemented method of claim 1, further comprising:
updating a source confidence value associated with the transaction based on a source confidence value of a source received from another execution manager or transaction rating unit.

11. The computer implemented method of claim 1, further comprising:
generating the emulated environment in response to receiving the transaction to be executed.

12. A non-transitory, computer readable storage medium comprising program code for performing the method of claim 1.

13. An execution manager configured to process a transaction and to mitigate a malicious attack occurring at an intended target environment resulting from processing the transaction, the execution manager comprising:
a communications module configured to receive a transaction to be executed at the intended target environment, the transaction comprising at least two portions;
an emulator configured to execute each portion of the transaction; and
a hardware processor configured to:
monitor the emulator during execution of a first portion of the transaction for presence of pre-defined events and/or internal state changes indicative of the malicious attack,
determine a first emulation confidence value relating to the first portion of the transaction based on the presence or absence of any monitored pre-defined events and/or internal state changes;
determine a source confidence value ($S_{CV}$) for a source of the transaction;
determine a first transaction confidence value ($T_{CV}$) based on the first emulation confidence value ($E_{CV}$cv);
vary a transaction confidence threshold based on the source confidence value ($S_{CV}$); and
compare the first transaction confidence value to the transaction confidence threshold to determine whether to execute the first portion of the transaction in the target environment;
responsive to determining that the first transaction confidence value exceeds the transaction confidence threshold, transfer the first portion of the transaction to the target environment for execution;
receive from the target environment a result of executing the first portion of the transaction;
responsive to determining successful execution of the first portion at the target environment based on the result of executing the first portion of the transaction, cause the emulator to execute a second portion of the transaction and monitor the emulated environment for the presence of pre-defined events and/or internal state changes indicative of the malicious attack;
determine a second emulation confidence value ($E_{CV}$) relating to the second portion of the transaction based on the presence or absence of any monitored pre-defined events and/or internal state changes;
determine a second transaction confidence value ($T_{CV}$) based on the second emulation confidence value ($E_{CV}$);
compare the second transaction confidence value to the transaction confidence threshold to determine whether to execute the second portion of the transaction in the target environment; and
responsive to determining that the second transaction confidence value exceeds the transaction confidence threshold, transfer the second portion of the transaction to the target environment for execution,
wherein the hardware processor is configured to transfer the first portion of the transaction to the target environment before assessing a safety of the second portion of the transaction or emulating a second portion of the transaction in response to successful execution of the first portion at the target environment.

14. A system comprising the execution manager of claim 13 and a target environment.

15. A system for processing a transaction that is configured to mitigate a malicious attack occurring at an intended target environment resulting from processing the transaction, the system comprising:

a computer-implemented execution manager configured to receive a transaction to be executed at the intended target environment, the transaction comprising at least two portions; to execute, in an emulated environment, each portion of the transaction, and to monitor the emulated environment for the presence of pre-defined events and/or internal state changes indicative of the malicious attack; and a hardware transaction rating unit configured to determine a first emulation confidence value relating to a first portion of the transaction based on the presence or absence of any monitored pre-defined events and/or internal state changes; and determine a source confidence value ($S_{CV}$) for a source of the transaction;

wherein the computer-implemented execution manager is further configured to:

determine a first transaction confidence value ($T_{CV}$) based on the first emulation confidence value ($E_{CV}$);

vary a transaction confidence threshold based on the source confidence value ($S_{CV}$); and compare the first transaction confidence value to the transaction confidence threshold to determine whether to execute the first portion of the transaction in the target environment;

responsive to determining that the first transaction confidence value exceeds the transaction confidence threshold, transfer the first portion of the transaction to the target environment for execution;

receive from the target environment a result of executing the first portion of the transaction;

responsive to determining successful execution of the first portion at the target environment based on the result of executing the first portion of the transaction, execute a second portion of the transaction and monitor the emulated environment for the presence of pre-defined events and/or internal state changes indicative of the malicious attack;

cause the computer-implemented transaction rating unit to determine a second emulation confidence value ($E_{CV}$) relating to the second portion of the transaction based on the presence or absence of any monitored pre-defined events and/or internal state changes;

determine a second transaction confidence value ($T_{CV}$) based on the second emulation confidence value ($E_{CV}$), compare the second transaction confidence value to the transaction confidence threshold to determine whether to execute the second portion of the transaction in the target environment;

responsive to determining that the second transaction confidence value exceeds the transaction confidence threshold, transfer the second portion of the transaction to the target environment for execution; and a threat analysis system configured to receive a plurality of first emulation confidence values for a plurality of transactions and to adjust the first emulation confidence values for future transactions based on the plurality of first emulation confidence values, wherein the computer-implemented execution manager is configured to transfer the first portion of the transaction to the target environment before assessing a safety of the second portion of the transaction or emulating a second portion of the transaction in response to successful execution of the first portion at the target environment.

16. The system of claim 15, wherein the target environment is remote from the computer-implemented execution manager and the computer-implemented transaction rating unit.

17. The system of claim 15, further comprising the target environment comprising a target in the target environment, wherein, for each portion of the transaction, the target is configured to receive the portion of the transaction in response to the computer-implemented execution manager determining that the portion of the transaction may be executed in the intended remote target environment, and to execute the portion of the transaction.

18. The system of claim 17, wherein, for each portion of the transaction, the computer-implemented execution manager is further configured to transmit an authorization to execute the portion of the transaction to the target environment.

19. The system of claim 17, wherein the computer-implemented execution manager is further configured to provide input for determining the source confidence value ($S_{CV}$) for the source of the transaction and to transmit one or more of the confidence values and/or a source identifier associated with the transaction to the target environment.

* * * * *